US012687483B2

(12) United States Patent     (10) Patent No.:   US 12,687,483 B2

Zhukov     (45) Date of Patent:     Jul. 21, 2026

(54) OPTICAL PARTICLE ANALYSER WITH ILLUMINATION AT AN OBLIQUE ANGLE ONTO A NON-TRANSPARENT MICROFLUIDIC CHIP

(71) Applicant: Cellular Highways Ltd, Cambridgeshire (GB)

(72) Inventor: Alex Zhukov, Cambridgeshire (GB)

(73) Assignee: Cellular Highways Ltd., Cambridgeshire (GB)

( * ) Notice: Subject to any disclaimer, the term of this patent is extended or adjusted under 35 U.S.C. 154(b) by 104 days.

(21) Appl. No.: 18/278,079

(22) PCT Filed: Feb. 11, 2022

(86) PCT No.: PCT/EP2022/053403

§ 371 (c)(1),
(2) Date: Aug. 23, 2023

(87) PCT Pub. No.: WO2022/179866

PCT Pub. Date: Sep. 1, 2022

(65) Prior Publication Data

US 2024/0133794 A1    Apr. 25, 2024
US 2024/0230510 A9    Jul. 11, 2024

(30) Foreign Application Priority Data

Feb. 23, 2021    (EP) .................................... 21158802

(51) Int. Cl.
*G01N 15/14*      (2006.01)
*G01N 15/1434*     (2024.01)
(52) U.S. Cl.
CPC . *G01N 15/1459* (2013.01); *G01N 2015/1447* (2013.01)

(58) Field of Classification Search
CPC ............. G01N 21/6428; G01N 33/582; G01N 2800/32; G01N 33/6887; G01N 2800/324;
(Continued)

(56) References Cited

U.S. PATENT DOCUMENTS 4,908,112 A * 3/1990 Pace ................. B01L 3/502761
                                 204/612
5,726,751 A * 3/1998 Altendorf ......... B01L 3/502715
                                 356/440

(Continued)

FOREIGN PATENT DOCUMENTS

CN    111054454 A * 4/2020 ........ B01L 3/502761
JP    H0882588 A * 3/1996
(Continued)

OTHER PUBLICATIONS

Kondoh Eiichu, et al. "Flat-Shaped Microfluidic Optical Cell for in situ Ellipsometry Using Glass Slide as Optical Window Component-Brief Notes," Japanese Journal of Applied Physics, Jun. 14, 2018.
(Continued)

*Primary Examiner* — Michael P Stafira
(74) *Attorney, Agent, or Firm* — Erise IP, P.A.

(57)              ABSTRACT

An optical particle analyser is provided; the analyser comprising: a microfluidic chip comprising: a flow channel for carrying particles; the flow channel arranged between a transparent window and a non-transparent substrate; a light source configured to emit an illumination beam towards the flow channel; wherein the microfluidic chip and the light source are arranged such that, in use, the illumination beam impinges the window at an oblique angle of incidence. By providing the optical particle analyser in this manner, high performance particle analysis may be accurately carried out.

13 Claims, 6 Drawing Sheets

(58) Field of Classification Search
CPC ....... G01N 15/1459; G01N 2015/1006; G01N
33/577; G01N 2800/52; G01N 15/06;
G01N 15/075; G01N 2015/1486; G01N
2201/1247; G01N 2201/12761; G01N
33/68; G01N 33/6893; G01N 2333/47;
G01N 2800/325; G01N 2333/4712; G01N
33/6869; G01N 2015/0038; G01N
2201/06113; G01N 2201/062; G01N
2015/1402; G01N 21/6486; G01N
2800/50; G01N 21/6452; G01N 2333/32;
G01N 2333/525; G01N 2333/54; G01N
2333/5412; G01N 2333/58; G01N
2800/60; G01N 15/1434; G01N 21/645;
G01N 15/14; G01N 15/1429; G01N
15/1484; G01N 33/533; G01N 33/54306;
G01N 33/6896; G01N 33/74; G01N
15/1404; G01N 15/1433; G01N 15/1456;
G01N 2015/0053; G01N 2015/1413;
G01N 2015/1447; G01N 2015/1452;
G01N 21/64; G01N 21/6458; G01N
2201/02; G01N 2201/0697; G01N
2333/475; G01N 33/53; G01N 33/6863;
G01N 33/6872; G01N 33/92; G01N
33/58; G01N 1/28; G01N 15/1425; G01N
2015/1438; G01N 2021/6419; G01N
2021/6421; G01N 2021/6439; G01N
2021/6441; G01N 2035/1034; G01N
2201/0612; G01N 2201/103; G01N
2201/104; G01N 2201/105; G01N
27/447; G01N 33/5302; G01N 33/536;
G01N 33/6845; G01N 35/1095; G01N
2015/1493; G01N 21/31; G01N 2333/52;
G01N 2333/96455; G01N 2333/96494;
G01N 2800/2821; G01N 2800/54; G01N
33/57415; G01N 33/57434; G01N
33/585; G01N 35/00029; G01N 15/1436;
G01N 2015/144; G01N 21/6456; G01N
2333/515; G01N 33/54313
See application file for complete search history.

(56) References Cited

U.S. PATENT DOCUMENTS

| | | | | |
|---|---|---|---|---|
| 6,200,814 | B1 * | 3/2001 | Malmqvist | .......... G01N 21/648 |
| | | | | 422/417 |
| 2009/0116005 | A1 | 5/2009 | Furuki et al. | |
| 2010/0220315 | A1 * | 9/2010 | Morrell | .............. G01N 15/1436 |
| | | | | 356/73 |
| 2013/0016335 | A1 | 1/2013 | Lo et al. | |
| 2018/0364270 | A1 * | 12/2018 | Chiu | ............... G01N 35/00069 |
| 2021/0255085 | A1 * | 8/2021 | Souchkov | .......... G01N 15/1425 |
| 2022/0113243 | A1 * | 4/2022 | Chun | ................ G01N 15/0255 |

FOREIGN PATENT DOCUMENTS

| | | | | | |
|---|---|---|---|---|---|
| WO | | WO-9712223 | A1 * | 4/1997 | ........ B01L 3/502715 |
| WO | | 03/006964 | A1 | 1/2003 | |
| WO | | WO-2017007954 | A1 * | 1/2017 | ............ B01L 3/5025 |
| WO | | WO-2022155186 | A1 * | 7/2022 | ........... C12N 5/0068 |

OTHER PUBLICATIONS

PCT Patent Application No. PCT/EP2022/053403, International Search Report and Written Opinion, May 20, 2022.
Anil B. Shrirao, et al., Microfluidic flow cytometry: The role of microfabrication methodologies, performance and functional specification, Technology, vol. 6, No. 1, Mar. 2018, World Scientific Publishing Co.
Arvind Chandrasekaran, et al., Hybrid Integrated Silicon Microfluidic Platform for Fluorescence Based Biodetection, Sensors 2007, 7, 1901-1915, 2007, www .mdpi.org/sensors.
European Patent Application 21158802.5 Examination Report issued May 17, 2024.

* cited by examiner

FSC for different bead sizes $y = 13.726x + 129.01$
$R^2 = 0.9991$

Bead diameter squared [um^2]

OPTICAL PARTICLE ANALYSER WITH ILLUMINATION AT AN OBLIQUE ANGLE ONTO A NON-TRANSPARENT MICROFLUIDIC CHIP

RELATED APPLICATION

The present application is a national stage application under 35 U.S.C. § 371 of International Application No. PCT/EP2022/053403, filed Feb. 11, 2022, which claims priority to European Patent Application No. 21158802.5, filed Feb. 23, 2021. The above referenced applications are hereby incorporated by reference.

FIELD

The invention is related to the optical measurement of particles in a flow of liquid, also known as flow cytometry. Flow cytometry has been very well developed in the last 60 years and conventionally measures particles in a transparent cuvette, capillary or stream-in-air that allow the transmission of a light beam. These optical measurements include forward scatter (FSC), which may be measured as the positive small angle light scatter (SALS) or the loss of light by scattering from the incident beam known as occultation, obscuration or axial light loss. Wide angle light scattering (known as side scatter or SSC), and fluorescence may also be measured. Fluorescence measurements are typically made at several excitation and emission wavelengths. The results of these measurements may be used to determine properties of the particles.

A recent trend in flow cytometry is to enclose the flow of liquid in a disposable microfluidic chip. This is particularly of benefit for cell sorting, for applications that require a fully enclosed or sterile system. An example application is therapeutic cell sorting, which requires sterility and containment of the sample for good manufacturing practice (GMP) regulations. Other applications include handling of biohazards and cells that are sensitive to contaminants.

Various techniques can be used for the actuation of the chip-based sorters, but in general, higher performance (sorting rate or sort envelope time) can be achieved by a reduction of the scale of the actuator and channel features. That implies a presence of microstructures within the chip (apart from the microfluidic channels) and the need for a microfabrication of complex micromechanical and/or electrical features.

Here, the usage of opaque materials in the chip brings several advantages over transparent alternatives. For example, silicon is widely used to make fine structures, but presents the challenge that it is non-transparent to the wavelengths of excitation light below 1 μm commonly used in cytometry. This can be remedied in part with a window layer of a material such as glass, which is transparent to these wavelengths, may be bonded to a structured silicon substrate to seal channels for the flow of a particle suspension while allowing the optical interrogation through the window layer.

Another advantage of using such a non-transparent chip are that the mechanical design of the fluidic system and other connections to the chip becomes simpler: one face of the chip is open to optical interrogation, leaving the other face for input and output of fluids, and potentially other connections such as electrical contacts. The product design to facilitate a user task of inserting a chip-containing cartridge onto an optical cytometry instrument may therefore be more straightforward, since one side of the cartridge may be handled while the other side interfaces with the instrument.

It is clear non-transparent chips are associated with many desirable effects. However, significant disadvantages remain with non-transparent chips. For example, it is harder to get an undisturbed light scatter measurement, either close to 0 degrees (in the case of FSC) or close to 90 degrees (in the case of SSC), due to only one face being transparent to optical interrogation. Moreover, commonly used optical configurations in which a single objective lens is used for both illumination and light collection (epi-illumination) present disadvantages, firstly that background scatter and background fluorescence may be increased relative to separate lenses being used for illumination and collection, due to fluorescence and scatter from the lenses, and secondly that a ray of light from the objective lens to the chip substrate and back to the objective lens traverses a particle twice, thus complicating a scatter measurement.

It is an objective of the present invention to provide a flow cytometry system that addresses these issues.

SUMMARY

According to a first aspect of the invention, there is provided an optical particle analyser, comprising: a microfluidic chip comprising: a flow channel for carrying particles; the flow channel arranged between a transparent window and a non-transparent substrate; a light source configured to emit an illumination beam towards the flow channel; wherein the microfluidic chip and the light source are arranged such that, in use, the illumination beam impinges the window at an oblique angle of incidence.

In this way, the optical particle analyser benefits from the non-transparent microfluidic chip (e.g. ease of microstructure fabrication on the chip, simplified connections to other components) while avoiding many of the common issues with known cytometers. In particular, illuminating the microfluidic chip at an oblique angle reduces the likelihood of a ray of light repeatedly traversing a tested particle, thereby simplifying scatter measurements and analysis. Furthermore, oblique angle illumination (and therefore detection) of the non-transparent chip reduces interfering background scatter and fluorescence measurements.

As used herein, the terms cytometer, flow cytometer, and flow cytometry system are used interchangeably throughout the application to refer to an optical particle analyser as provided by the invention.

Optionally, the illumination beam is linearly polarized before it impinges the window, and the angle of incidence is equal to the Brewster angle of the window.

In particular, this is the Brewster angle of the window and surrounding medium (e.g. air). This reduces stray reflections at the window that would otherwise interfere with light measurements. The illumination beam may be polarized at the light source or by a separate polarizing component arranged between the light source and microfluidic chip.

Optionally, the light source is further configured such that the emitted illumination beam uniformly illuminates particles in the flow channel.

Uniform illumination of the particles minimises variations in measurements caused by irregular combinations of incident and reflected light, thereby reducing the coefficient of variation of the optical particle analyser. That is, the optical responses generated by examined particles are substantially equalised (e.g. in intensity, shape and width).

Optionally, the illumination beam is a stigmatic Gaussian illumination beam, or a top-hat beam. These beams can be configured to provide uniform illumination of the flow channel.

Optionally, the optical particle analyser further comprises an FSC detector arranged in the path of the illumination beam after it has been specularly reflected from the microfluidic chip; wherein the FSC detector is configured to measure forward scatter of the illumination beam.

In this way forward scatter (FSC) of light reflected from the microfluidic chip may be measured, and variations in these measurements can be used to analyse particles (e.g. the size of a particle) passing through the flow channel of the chip and interacting with the beam.

Optionally, the optical particle analyser further comprises a beam stop or spatial filter arranged between the chip and the FSC detector; wherein the beam stop is configured to absorb the specularly reflected illumination beam; and the spatial filter is configured to pass the specularly reflected illumination beam and block light scattered by particles in the flow channel.

Arranging a beam stop between the chip and FSC detector prevents the specularly reflected illumination beam reaching the FSC detector. This allows small angle light scatter (SALS) of the beam to be more accurately measured.

Arranging a spatial filter that passes the specularly reflected beam but blocks scattered light is arranged between the chip and FSC detector, this allows occultation of the illumination beam (i.e. due to a particle in the flow channel) to be accurately measured. Examples of spatial filters include a pinhole or a slit filter.

Preferably, the optical particle analyser further comprises a forward collection lens arranged between the microfluidic chip and the FSC detector.

This forward collection lens is configured to collect reflected light and/or small angle scattered light and direct it towards the FSC detector. This increases the amount of light that reaches the detector and thereby reduces the error of the optical particle analyser. The forward collection lens may be arranged in front of the beam stop/spatial filter (with respect to the travel path of the beam) or behind the beam stop/spatial filter.

Optionally, the optical particle analyser further comprises an SSC detector configured to measure side scatter of the illumination beam.

In this way, more accurate measurements and further properties (e.g. internal structure) of tested particles may be determined by examining the side-scattered light (SSC) at around 90° (often within the range 60°-120° or a larger interval) to the plane of the chip.

Optionally, the optical particle analyser further comprises a fluorescence detector configured to measure fluorescence from the microfluidic chip at one or more wavelengths.

The emission of radiation associated with a possible absorption of the illumination beam by an examined particle can provide further information regarding the particle, particularly when such a particle is fluorescently labelled.

Preferably, the optical particle analyser further comprises a side collection lens arranged between the microfluidic chip and the SSC detector and/or the fluorescence detector.

In this way, light scattered and/or radiation emitted at significantly larger angles can be collected and focused towards the SSC detector and/or the fluorescence detector for measurement.

Optionally, the optical particle analyser a particle focusing mechanism configured to concentrate particles within the flow channel.

Focusing the particles further improves the uniform illumination of particles within the flow channel as the range of possible particle positions is reduced.

Optionally, the particle focusing mechanism is an inertial focuser configured to produce two particle foci; wherein the particle foci are aligned with respect to the plane of the microfluidic chip.

In this way, particles can be focused without the additional fluid needed for sheath flow—thereby avoiding associated sterility complications.

Optionally, the particle focusing mechanism is a 2D sheath flow configured to concentrate particles within a narrow range of the flow channel with respect to the width of the flow channel. 2D sheath flow particle focusing mechanisms are typically simple to implement and are suitable for basic optical particle analysis.

Optionally, the particle focusing mechanism is a 3D sheath flow configured to concentrate particles within a narrow range of the flow channel with respect to the width and height of the flow channel. The 3D sheath flow particle focusing mechanism can provide a smaller particle focus region than 2D sheath flow.

Optionally, the substrate comprises a reflective coating. In this way, the reflection of an impinging illumination beam, scattered light, or fluorescence is enhanced for detection.

BRIEF DESCRIPTION OF THE DRAWINGS

Aspects of the invention will now be described, by way of example only, with reference to the accompanying drawings, in which.

DETAILED DESCRIPTION

Figure 1:
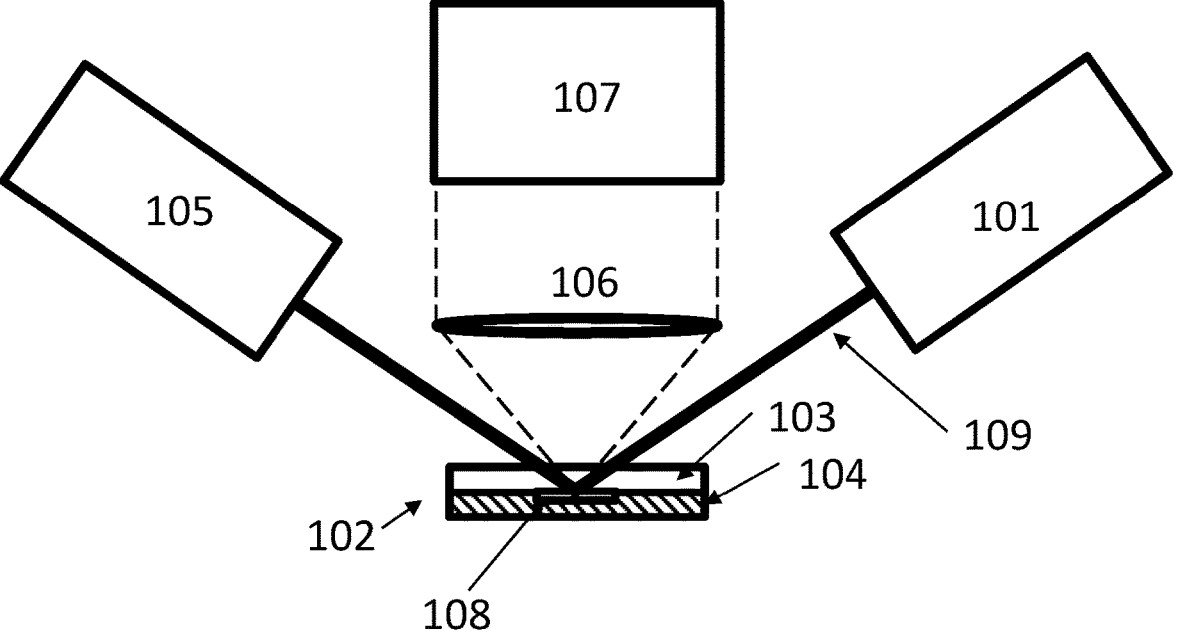
FIG. 1 shows an example configuration of the optical particle analyser.

An example of the invention is shown in FIG. 1. An optical particle analyser of the present invention comprises a light source 101, a microfluidic chip 102, an FSC detection module 105, a side collection lens 106, and a side detection module 107.

The light source 101, which can be an LED, laser, arc lamp, or an assembly of light sources, produces a collimated beam of light 109 at one or several wavelengths. In a preferred example the light source 101 is a laser or multiple lasers and the light source 101 includes the optics required to deliver an elliptical laser spot(s) of roughly 5-15 μm diameter in the direction of the particle flow and 40-100 μm across the microfluidic channel. The light is focused on the microfluidic chip 102, which comprises two layers: a non-transparent substrate 104 and transparent window layer 103. In use, the light passes through the window layer 103, impinges on a first surface of the substrate 104 and is reflected.

A flow channel 108 is arranged between the window 103 and substrate 104. In use, particles to be analysed pass along the flow channel 108—carried by a stream of carrier fluid. In FIG. 1, the chip 102 is shown as a cross section where the rectangular flow channel 108 runs perpendicularly to the cross section (i.e. the flow channel runs into/out of the page).

The substrate 104 is preferably silicon, preferably polished on the first surface and preferably covered with a highly reflective coating (reflectivity R>0.8), e.g. a thin metallic film. Uncoated polished silicon is also permissible: in the case of Si and 488 nm illumination, R=0.4. BORO-FLOAT® 33 (BF33) glass (e.g., floated borosilicate glass) _glass and polydimethylsiloxane (PDMS) are suitable materials for the transparent window material 103 since they have high optical clarity and are transparent across the visible spectrum, including the wavelengths typically used in flow cytometry.

As shown in FIG. 1, the light source 101 and microfluidic chip 102 are arranged such that, when in use, an illumination beam 109 emitted by the light source 101 impinges the chip 102 at an oblique angle. This avoids many of the difficulties associated with epi-illumination, such as increased relative scatter/fluorescence and light traversing a particle twice.

The FSC detection module 105 is positioned in the direction of the reflected beam and designed to detect either small angle light scatter (SALS) or occultation. The FSC detection module 105 comprises a FSC detector, which may be a photodiode or other light-sensitive electronic detector. In some examples, a forward collection lens 110 (not shown) is arranged between the microfluidic chip and the FSC detector. The forward collection lens 110 collects specularly reflected light from the chip 102 and directs it towards the FSC detector.

When the FSC detection module 105 is configured for SALS detection, then preferably it comprises a beam stop to block the specular reflected direct beam 109 while allowing scattered light to reach the FSC detector. Alternatively, when measuring occultation, the FSC detection module 105 may comprise a spatial filter (such as pinhole or slit), or a detector of limited size, that passes the reflected beam while preventing scattered light from reaching the detector. In addition, a polarizer may be added in front of the FSC detector, which allows an extra degree of freedom in adjusting the relative intensity of each polarisation reaching the FSC detector.

The FSC detection described above is useful for the sizing of particles and to trigger measurement of further optical parameters of a particle. However, it is usually not sufficient to distinguish between different objects of similar size and refractive index, which may have differing internal structure. One good example are peripheral blood mononuclear cells (PBMCs), which are a mixture of different blood cells including lymphocytes, monocytes, and granulocytes. Depending on the instrument specification, it is possible, for example, to separate one population by using only FSC, but not all three. Therefore, it is beneficial to measure another scatter parameter which is more sensitive to the internal cell structure or internal granularity.

This granularity measurement is usually made by detecting the side-scattered light (SSC) at around 90° (often within the range 60°-120° or a larger interval) to the plane of the chip 102. Further, an emission of radiation associated with a possible absorption of the incident beam 109 by an examined particle can be highly informative, particularly when such a particle is labelled with fluorophore molecules. In the field of flow cytometry these typically include staining of surface biomarkers, intracellular dyes, or fluorescent proteins.

At these significantly larger angles, light scattered from the chip 102 and any other radiation associated with a presence of a particle in the stream of liquid, for example fluorescence, is collected by a side lens 106 and focused towards the side detection module 107. The side lens 106 is chosen with as high a numerical aperture (NA) as possible to maximise collection of SSC and fluorescence, typically NA>0.2, and is arranged in the perpendicular direction to the first surface of the substrate 104. It can be used simultaneously for wide-angle illumination and microscopic imaging of the chip 102. The side detection module 107 comprises an SSC detector, configured to measure side scatter of the illumination beam 109, and/or a fluorescence detector configured to measure fluorescence from the microfluidic chip 102 at one or more wavelengths.

Further separation of the collected light by wavelength and/or point of emission can be integrated into the side detection module 107, thus allowing side scatter (SSC) and multiple fluorescence channels (FL) to be measured. In an example, the side detection module 107 uses dichroic mirrors to separate illumination wavelength from fluorescence, a stack of dichroic mirrors and bandpass filters to select the detectable spectral range for each channel and optical detectors (typically photomultiplier tubes, silicon photomultipliers or avalanche photodiodes). In some examples, a blocking mask may be introduced (e.g. to the lens 106 or side detection module 107) to further improve large angle detection by limiting the angles from which light is collected.

Figure 2A:
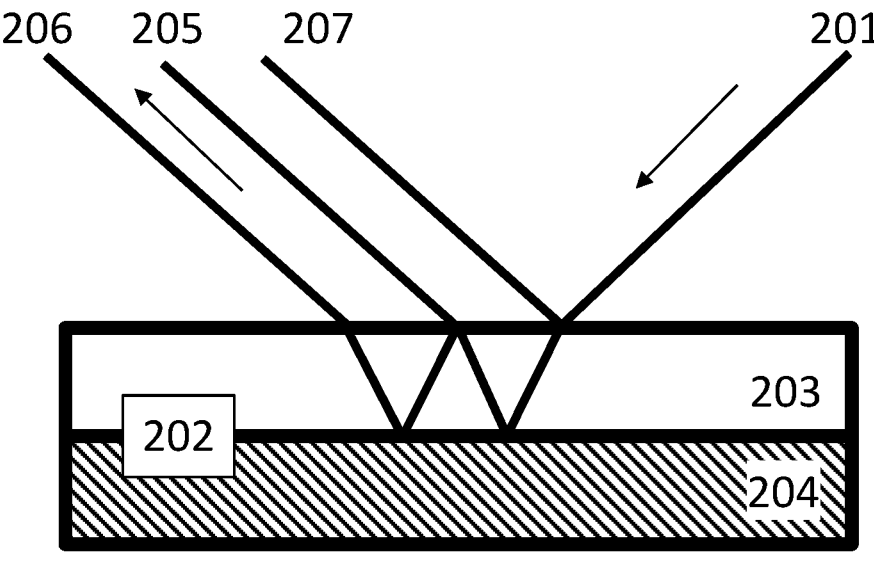
FIGS. 2A and 2B show the illumination beam interacting with the microfluidic chip in two examples of the optical particle analyser.
Figure 2B:
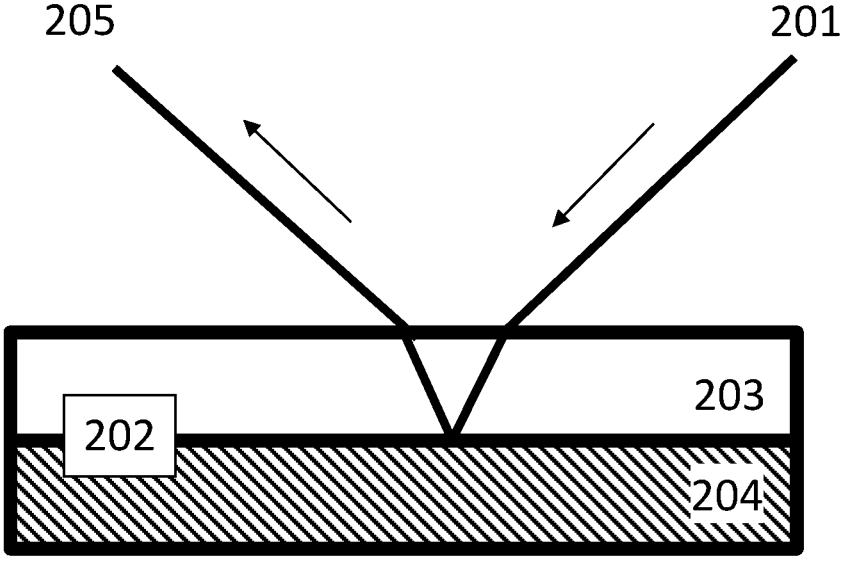

FIGS. 2A and 2B illustrate two examples of the invention where incident light 201 (i.e. from the light source 101) interacts with the microfluidic chip 202. Generally, the incident light 201 produces multiple reflections 205, 206, 207 when impinging the chip 202. These extra reflections 206, 207 from the chip-air interface make further detection of scattered light more difficult by, for example, producing additional background signal(s) or increasing the complexity of the required detection arrangement (e.g. the FSC detection module 105). Therefore, in a preferred example, the illumination beam 109 is linearly polarized before contacting the chip 202 and, in addition, the light source 101 and microfluidic chip 202 are arranged such that the illumination beam 109 impinges the window layer 203 at an angle close to the Brewster's angle between the air and window layer 203 material. As shown in FIG. 2B, this substantially eliminates the undesirable reflections 206, 207 and scattering. The resulting single reflected beam 205 is analysed by the FSC detection module 105, arranged opposite to the light source 101 at the angle for specular reflection from the chip 202, without effects arising from the presence of additional reflections.

Though the above disclosure relates to an optical particle analyser with a single illumination beam, in another example multiple spatially separated illuminating beams are used to produce delayed FSC signals and give accurate information about the velocity of flowing particles. Preferably, in such an example, the separate beams are targeted across the flow channel to coincide with an implemented particle focusing mechanism.

One of the most important measures of the quality of the instrument is the coefficient of variation (CV) of any type of optical measurement acquired from identical objects, for example the FSC peak height measured for monodisperse polystyrene beads. The CV is defined as the standard deviation divided by the mean of the ensemble of measurements. Oblique angle illumination has the challenge that the light intensity field within the flow channel of the microfluidic chip may be variable due to the combination of incident and reflected beams. This causes imprecision in cytometry measurements such as fluorescence and light scatter. Therefore, it is important that illumination intensity at the range of particle positions is equalised as much as possible, to minimise this source of measurement variation caused by the instrument.

Figure 3A:
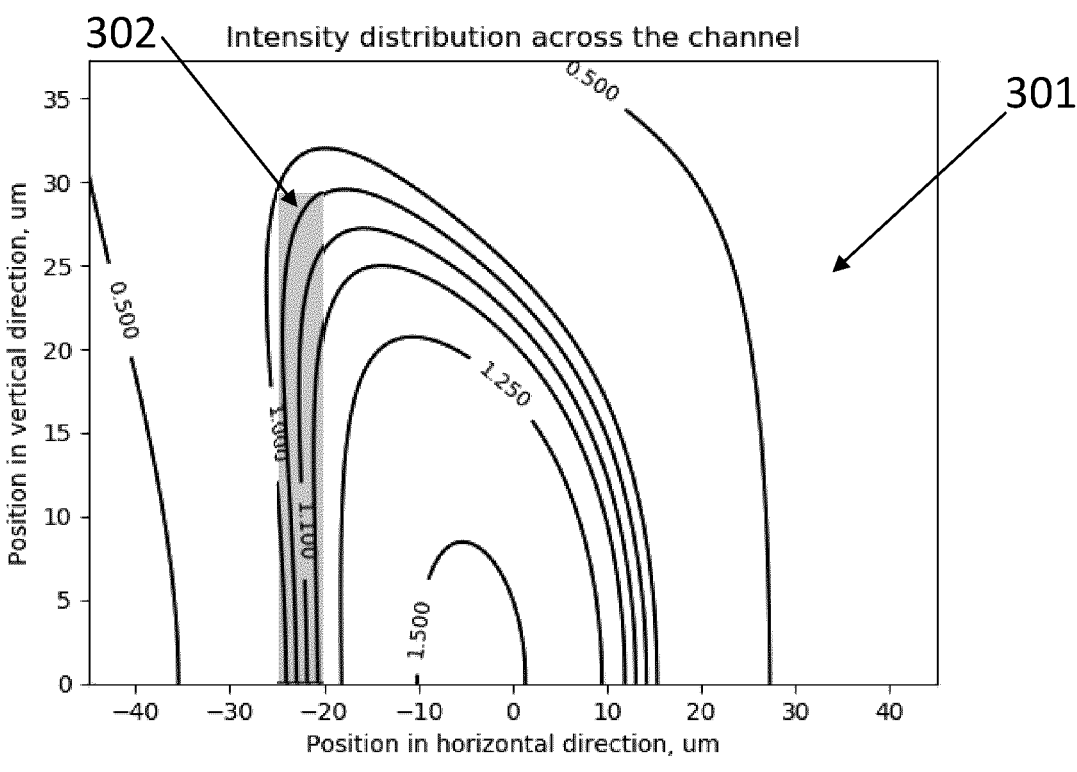
FIG. 3A shows the intensity distribution of a stigmatic Gaussian illumination beam across a flow channel of the optical particle analyser.
Figure 3B:
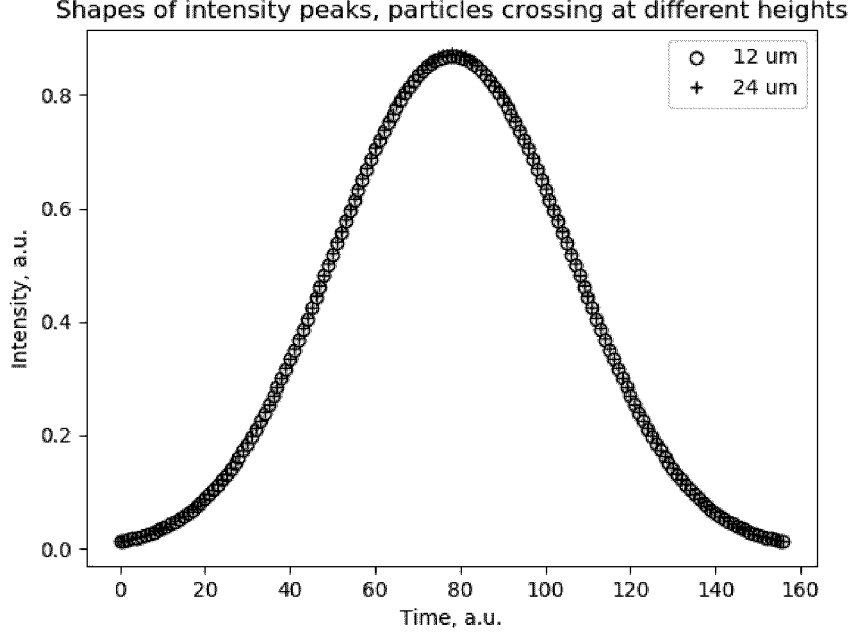
FIG. 3B shows illumination intensity with respect to time of two spheres flowing along two inertial foci within a flow channel of the optical particle analyser.
Figure 3C:
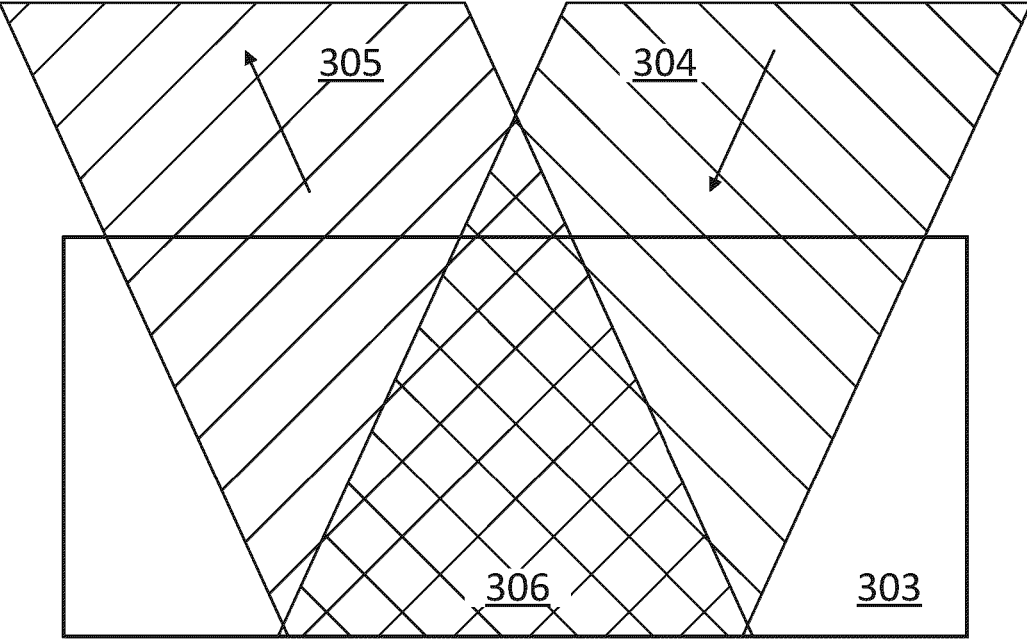
FIG. 3C shows a representation of a top-hat beam passing through a flow channel of the optical particle analyser.

In one example of the invention, shown in FIG. 3C, a so-called flat-top or top-hat beam 304 (a beam with a substantially uniform intensity across a defined width) is used for the illumination of the flow channel 303. Together with its reflected beam 305, the top-hat beam forms a triangular region of equal illumination 306. It is important that top-hat beam is uniform in the direction perpendicular to the plane of the figure, for example by having a rectangular cross-section. Moreover, the depth of focus of such illumination should be enough to avoid any major profile distortions within the channel. The width of the beam is preferably greater than 2 h sin (α), where h is the channel height and α is the angle of incidence.

In another example, a stigmatic Gaussian illumination beam is provided with a circular or elliptical cross-section. In this case, a more advanced analysis is used to demonstrate the equalisation of the intensities, such as numerical computation of the light intensity field. FIG. 3A presents the numerical results of the intensity distribution across the rectangular channel.

The vertical axis (z) is perpendicular to the first surface of the substrate, while the horizontal axis (y) is parallel to the first surface of the substrate, such that the incident beam is in the plane of the two axes. The zero of the vertical axis is defined as the intersection of the first surface of the substrate, while the zero of the horizontal axis is defined as the centre of the rectangular flow channel.

The Gaussian waist is defined as the position along the beam where the light intensity is maximised, and the width of the beam is minimised. The width is defined at the Gaussian waist as the distance perpendicular to the beam where the intensity drops by the inverse square of Euler's number of its peak intensity. In this example, the beam is 48 μm wide in the plane of drawing and 5.6 μm wide across. The angle of incidence is 55° in air which is converted into 38° in the aqueous suspension medium of the particles. The Gaussian waists were offset by 27 μm towards the source of the incident beam. Similar results arise from different beam sizes, channel geometries, angles of incidence and reflectivity of the bottom of the channel, so the numbers above serve only as an example. Isolines of equal intensities across the channel are shown. There is a vertically elongated region of substantially uniform intensity 302 which is well-suited for the illumination of two distinct particle foci as in inertial particle focusing, or a range of vertical particle positions, as in 2D or 3D sheath flow. Moreover, the uniformity is achieved not only in the cross section of the channel, but also along the axis parallel to the channel.

The numerical calculation of the illumination intensity with respect to time of two spheres of 6 μm diameter flowing along the channel at heights of 12 μm and 24 μm from the first surface of the substrate are shown in FIG. 3B. These heights correspond approximately to the positions of the inertial particle foci in a rectangular channel of 36 μm height. The centre of the incident beam was shifted by 23 μm in the horizontal direction to move the region 302 to the centre of the channel where the inertial particle foci are positioned in a rectangular channel. Provided that the particles flow at the same speed in their various positions, all optical measures of the particles, such as FSC, SSC and fluorescence height, width and area are substantially equal for the stream under this illumination. There is a small difference of 0.3% between the streams when area, width or height of the peaks is calculated but this is much smaller than other sources of experimental variation for a typical current cytometer.

Figure 4A:
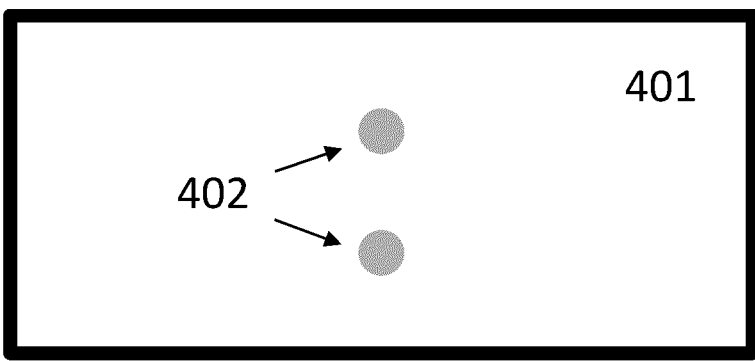
FIG. 4A shows a representation of possible particle positions in a flow channel using an inertial particle focuser as a particle focusing mechanism.
Figure 4B:
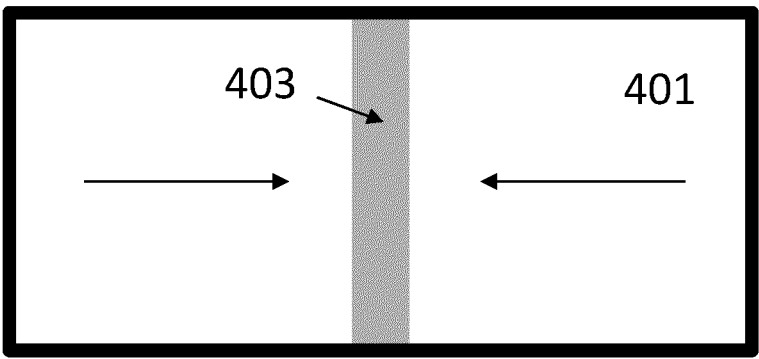
FIG. 4B shows a representation of possible particle positions in a flow channel using a 2D sheath flow as a particle focusing mechanism.
Figure 4C:
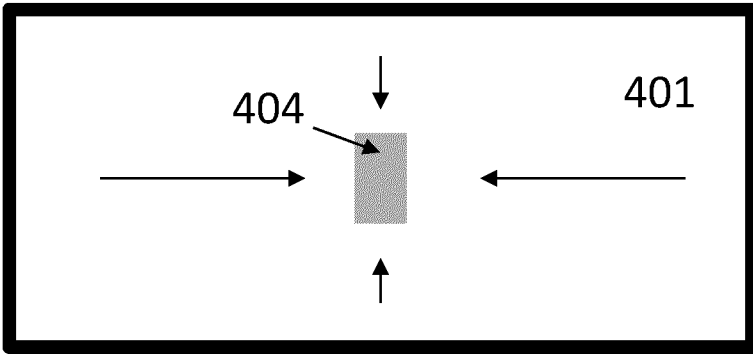
FIG. 4C shows a representation of possible particle positions in a flow channel using a 3D sheath flow as a particle focusing mechanism.

FIGS. 4A-4C show several different particle focusing mechanisms with example regions of particle positions in the cross section of a flow channel 401.

It is a challenge to uniformly illuminate all possible positions of a particle within a flow channel. Particle focusing, i.e. the concentration of particle positions to particular points or areas in the cross section of a flow channel, may be used in cytometry to make particles encounter a more uniform illumination than they would otherwise (i.e. if their positions were unbiased across the flow channel cross section). No particle focusing mechanism is universal and they must be selected based on the circumstances of the analyses. Hydrodynamic focusing by sheath flow may be introduced in both axes of the cross section (also known as 3D sheath flow) or on one axis of the cross section (also known as 2D sheath flow). The ratio of sheath fluid to sample stream volumetric flow determines the area in which particles are located in the cross section. As an alternative to sheath flow, the inertial focusing in a flow channel 401 may be desirable as it avoids the extra liquid required for sheath flow, and therefore the associated sterility complications. Depending on the channel dimensions the range of particle positions in the sheath flow or the distance between the inertial foci can be 10 μm or more.

FIG. 4A shows an example of inertial focusing, where particles are focused at two positions, inertial foci 402, aligned at the centre of the long side of the channel 401.

FIG. 4B shows an example of 2D sheath flow focusing, where a sheath fluid has been introduced symmetrically on two sides to restrict particle positions to a narrow strip in the centre of the channel along one axis 403.

FIG. 4C shows an example of 3D sheath flow focusing, where sheath fluid is introduced symmetrically on all four sides of the channel to restrict particle positions to a rectangle at the centre of the channel.

In flow cytometry, accurate alignment of the components of the optical particle analyser is important. A preferred method of aligning the microfluidic chip 102 with respect to the focus of an illumination beam 109 is as follows.

First, a course alignment is made using an alignment chip, which comprises an identical microfluidic chip to that used for particle analysis, to which a thin fluorescent layer, preferably thinner than 5 μm is added between the non-transparent substrate and the transparent window layer. This alignment chip is placed in the beam 109. A camera is employed within the FSC detection module 107 to image the alignment chip and the beam focus by its fluorescence within the alignment chip. The position and shape of the laser focus within the image allows the user to adjust the chip position and beam shaping lenses until the beam waists are located close to the first surface of the substrate and the beam y-position is located close to the centre of the microfluidic channel. The image of the beam focus in the thin fluorescence layer is narrowest in each dimension when the beam waists are in the correct position.

Second, the microfluidic chip 102 is placed in the beam 109 and fluorescent calibration particles with a substantially monodisperse range of fluorescence intensities are flowed through the chip 102 at a constant flow rate. The user observes the fluorescence peaks generated when such particles cross the illumination beam 109, and finely adjusts the chip position. By varying the microfluidic chip's z-position, the user finds the position that minimizes the width of the fluorescence peaks, which sets the offset of the Gaussian waist. Then the user makes a fine adjustment of the chip's y-position to equalize the peak fluorescence intensities, which sets the y-shift of the region of uniform illumination. In an optional improvement to the method, the fine y- and z-adjustments are made by automated scanning within ranges defined by the chip cross-section.

Figure 5A:
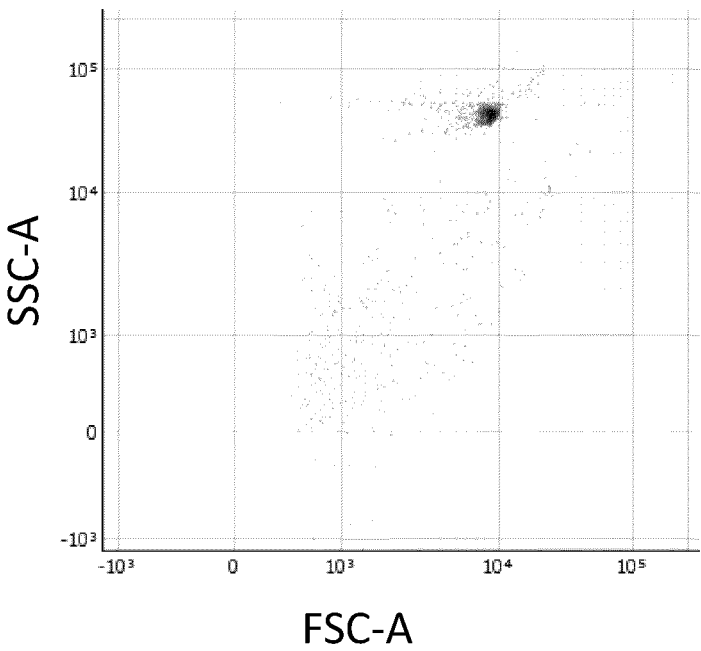
FIG. 5A shows an example of forward scatter and side scatter measurements in an example of the optical particle analyser.
Figure 5B:
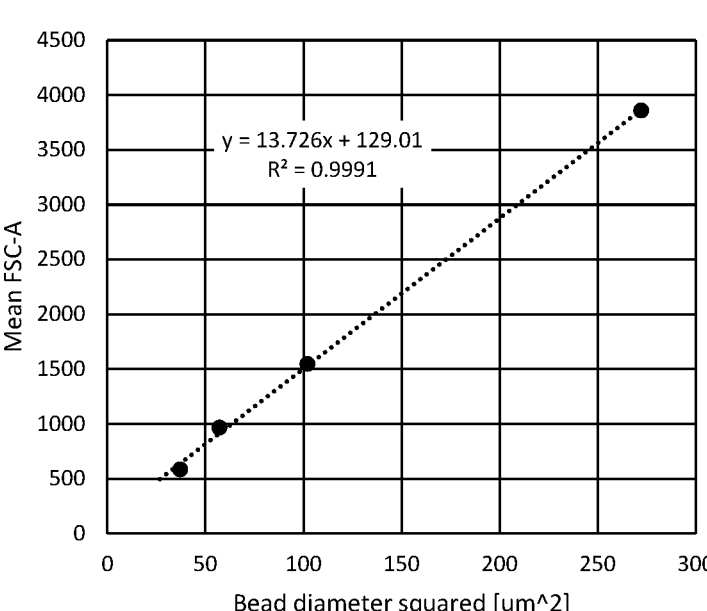
FIG. 5B shows an example of occultation measurements in an example of the optical particle analyser.

FIGS. 5A and 5B show representative results from the use of a preferred example of the invention as shown in FIG. 1.

Specifically, FIG. 5A shows a 2D histogram (dot plot) of FSC and SSC measurements of monodisperse polystyrene calibration beads. The variation on both axes is low, showing that the optical particle analyser obtains similar FSC and SSC measurements of these beads, despite the range in particle positions within the channel cross section.

FIG. 5B shows mean FSC-A measurements for a range of monodisperse polystyrene calibration particle sizes. The proportionality of FSC-A to the square of bead diameter, thus proportional to bead cross section, shows that the optical particle analyser can accurately determine the particle size from FSC-A measurements, despite the range in particle positions within the channel cross section.

The invention claimed is:

1. An optical particle analyser, comprising:
   a microfluidic chip having a flow channel for carrying particles arranged between a transparent window and a non-transparent substrate, at least a portion of the flow channel having a rectangular cross section; and
   a light source configured to emit an illumination beam towards the flow channel,
      wherein the microfluidic chip and the light source are arranged such that, in use, an angle of incidence of the illumination beam impinges the transparent window at an oblique angle;
   a particle focusing mechanism configured to concentrate the particles within the flow channel;
      wherein the particle focusing mechanism is configured to produce two particle foci;
      wherein each particle foci are aligned with respect to a plane of the microfluidic chip; and wherein the light source is further configured such that the illumination beam uniformly illuminates the particles in the flow channel.

2. The optical particle analyser of claim 1, wherein the illumination beam is linearly polarized before it impinges the transparent window, and the angle of incidence is equal to a Brewster angle of the transparent window.

3. The optical particle analyser of claim 1, wherein the illumination beam is a stigmatic Gaussian illumination beam, or a top-hat beam.

4. The optical particle analyser of claim 1, further comprising an FSC detector arranged in a path of the illumination beam after it has been specularly reflected from the microfluidic chip;
   wherein the FSC detector is configured to measure forward scatter of the illumination beam.

5. The optical particle analyser of claim 4, further comprising:
   a beam stop or spatial filter arranged between the microfluidic chip and the FSC detector,
      wherein the beam stop is configured to absorb specular reflections of the illumination beam, and
      wherein the spatial filter is configured to pass the specular reflections of the illumination beam and block light scattered by the particles in the flow channel.

6. The optical particle analyser of claim 5, further comprising a forward collection lens arranged between the microfluidic chip and the FSC detector.

7. The optical particle analyser of claim 1, further comprising an SSC detector configured to measure side scatter of the illumination beam.

8. The optical particle analyser of claim 1, further comprising a fluorescence detector configured to measure fluorescence from the microfluidic chip at one or more wavelengths.

9. The optical particle analyser of claim 1, further comprising a side collection lens arranged between the microfluidic chip and a side detection module, wherein the side detection module comprises an SSC detector and/or a fluorescence detector.

10. The optical particle analyser of claim 1, wherein the particle focusing mechanism is an inertial focuser.

11. The optical particle analyser of claim 1, wherein the particle focusing mechanism is a 2D sheath flow configured to concentrate the particles within a narrow range of the flow channel with respect to a width of the flow channel.

12. The optical particle analyser of claim 1, wherein the particle focusing mechanism is a 3D sheath flow configured to concentrate the particles within a narrow range of the flow channel with respect to a width and height of the flow channel.

13. The optical particle analyser of claim 1, wherein the non-transparent substrate comprises a reflective coating.

\* \* \* \* \*